April 14, 1970     K. E. KISSELL     3,506,218
RESOLUTION CALIBRATION SATELLITE FOR TRACKING CAMERA
Filed Oct. 6, 1967
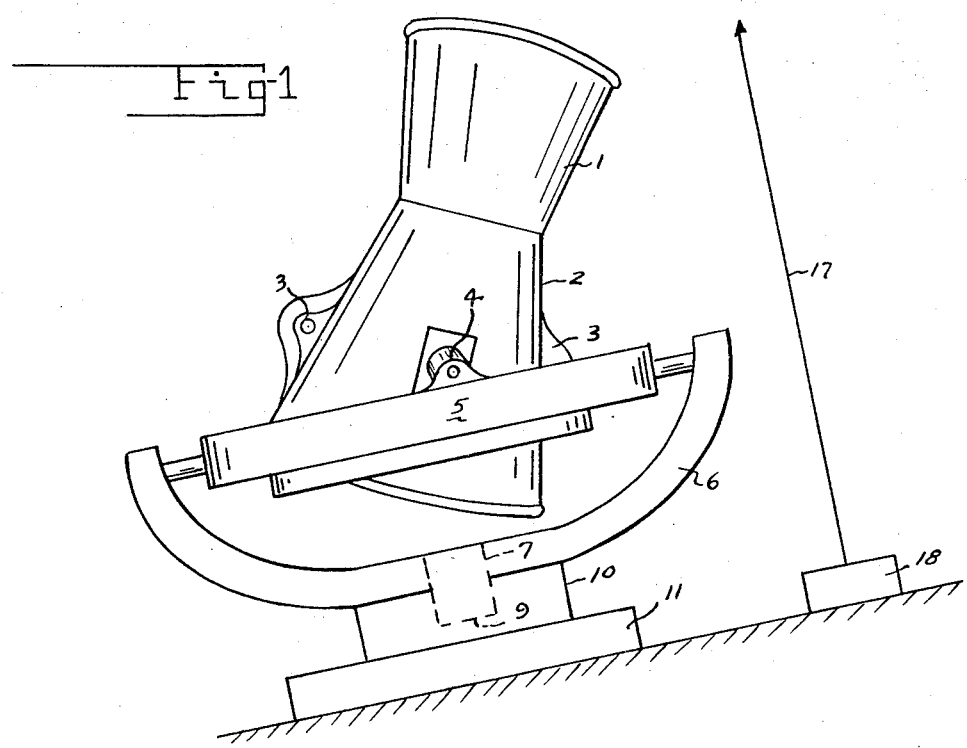
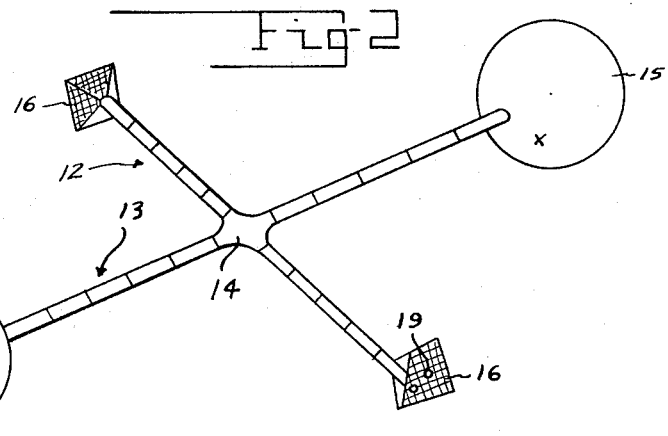
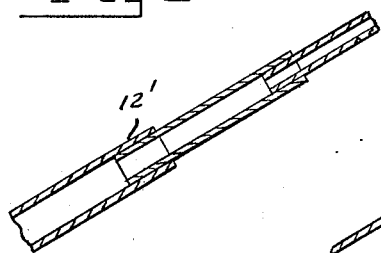
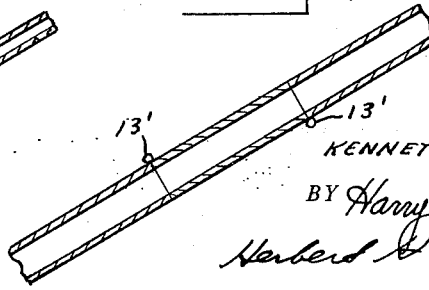
INVENTOR.
KENNETH E. KISSELL
BY Harry A. Herbert Jr.
Herbert W. Brown and
ATTORNEYS

United States Patent Office 3,506,218
Patented Apr. 14, 1970

3,506,218
RESOLUTION CALIBRATION SATELLITE FOR TRACKING CAMERA
Kenneth E. Kissell, Dayton, Ohio, assignor to the United States of America as represented by the Secretary of the Air Force
Filed Oct. 6, 1967, Ser. No. 674,065
Int. Cl. B64g *3/00;* G01b *9/06*
U.S. Cl. 244—1                                5 Claims

ABSTRACT OF THE DISCLOSURE

In order to determine the resolution of a satellite tracking camera or a telescope, a special form of satellite is caused to rotate about its center of mass such that it provides sets of very small and very bright points of light at known separations in space and at a known distance from the observer. This special satellite comprises an array of two highly reflective spheres and an array of two reflecting corner prisms. The arrays are placed at known distances apart and at right angles to one another when the satellite is placed in orbit. The spheres continuously reflect images of the sun and the prisms intermittently produce point-like sources of light when intermittently illuminated by a high power laser beam from the ground. The satellite is caused to rotate so that the spheres and prisms will describe elliptical paths as to cause the reflected light spots to change their apparent separation as seen from the camera or telescope when the satellite rotates slowly about its center of gravity. Thus, a target of point-like sources of light of known and varying separation is available on which the camera can be focused to determine the resolution of the camera for the distance for which it is designed to operate.

BACKGROUND OF THE INVENTION

When checking the performance of a tracking camera, particularly as to its resolution or sharpness of focus, one method has been to point the camera toward a part of the constellation in which two stars appear to be so close together in position as to be difficult to distinguish them as two separate objects. By observing different sets of such stars, some which can be resolved easily and some which are so close as not to be resolved, the performance of the telescope can be measured. This test is sometimes referred to as the "double star method." A camera of high resolution would normally show on its film that a very near pair of stars can be resolved or distinguished from each other when the earth's atmosphere is quite and the same pair of stars cannot be resolved when the atmosphere is disturbed. However, a camera which checks well under these conditions, may still not be able to follow and to photograph sharply and actual satellite travelling within an orbit only a few hundred miles from the earth. It also fails to allow for increased atmospheric seeing disturbances caused by the satellite's motion at high speed behind turbulent disturbances in the upper atmosphere as compared to the slower natural motion of these layers across the stellar images in the double star test. The problem in camera design is how to record faint light from a satellite moving at a velocity of as much as 2.0 degrees per second. Still another problem is the difficulty of evaluating under the actual conditions of their use, the optical quality of photographs taken with long focus telescopic cameras attempting to record the shape of orbiting satellites. These shapes vary considerably among the twelve hundred or so satellites now in orbit. Not only is the shape important to distinguish one satellite from another, but also to depict any change in shape of the satellite immediately after leaving the propulsion rocket, or due to the ravages of time and/or atmospheric disturbances during the orbital existence. A high resolution telescopic camera must be able to show these changes on film.

The second method used for determining resolution has been to paint a resolution target on an aircraft to fly at 65,000 to 80,000 feet, presumably above the turbulent layers. Here the angular rates are approximately simulated but the telescopic camera must be defocused from the near-infinity value (500,000–1,000,000 feet) used for satellites to a value proper for the much nearer aircraft. The focus must in fact be varied during tracking to keep the aircraft in focus as it flies over the telescope. The telescope must then be readjusted for satellite operations, thus making the data somewhat lacking in applicability to performance on satellites even a few hours Later. The aircraft method is also more restricted in the illumination conditions available for its use in that the atmospheric conditions in daytime or at dawn or dusk, with sunlight still available at aircraft altitude, may be more disturbed than exists in deep twilight when test satellites will still be sunlit at 100–500 miles altitude.

The third method has been a resolution pattern of alternate black and white stripes painted with diffusely-scattering paint onto a relatively large satellite. This provided a target at proper rates and altitudes. However, the short-wave ultraviolet radiation bleached the black paint in the pattern and darkened the white paint so that the contrast ratio of the targets decreased in a few weeks from an initial 10:1 to a value of some 3:1, i.e. the bright bars became only three times as bright as the intervening dark bars. Such an effect is inherent in any target pattern made by applying a painted overcoat although the time scale for degradation will depend upon the material. In addition, the actual angular separation represented by such a target applied to a linear body depends upon the aspect angle of viewing the tumbling satellite.

SUMMARY OF THE INVENTION

An object of the invention is to provide an easily interpreted resolution test pattern at orbital height which may be useful to allow the quantitative testing of telescopic cameras intended for use in photographing orbiting or ballistic objects. The photographs are useful in determining the nature of the object, also its shape while in orbit.

Another object is to provide a pseudo double star which would be an actual satellite in speed and travel in a true satellite orbit. The pseudo double star would give off adequate and dependable light in the form of two point-like sources which would appear to move relative to each other, similar to a changing double star configuration. Thus, the resolution of the camera can be determined and calibrated under practical operating conditions including the disturbing effects of atmospheric influences.

Another object is to provide an orbiting test pattern which can be detected photographically to test the ability of the telescope in recording fine detail in the image of a satellite.

Still another object is to provide apparatus for producing a test pattern which will yield an indefinitely long life time to exposure to space environment without loss of contrast against the sky background.

The final object is to provide a passive test satellite which, while it does not carry its own light source, effectively serves as a test pattern for determining and calibrating a telescopic camera under either the conditions of solar illumination or illumination by a coherent light source such as a high-power laser. These objects are attained in brief by constructing a satellite in cruciform shape, one set of arms carrying reflecting devices which are illuminated by a ground-based laser beam, and the other set carrying metallized spheres which are illuminated by the sun. As the satellite is slowly rotated, the points of light execute an elliptical course as seen from the camera and they move toward one another into and out of coalescence which can be sharply discerned by a camera having good resolution.

Other objects and features will be apparent as the specification is perused in connection with the accompanying drawing.

BRIEF DESCRIPTION OF THE DRAWING

FIGURE 1 represents an elevational outline or diagrammatic view of a typical 3-axis tracking camera the resolution factor of which is to be determined in the manner described hereinafter.

FIGURE 2 is a perspective view of the improved pseudo-double star satellite which is placed in orbit to be used as a target in determining the resolution of the camera.

FIGURE 3 is a sectional view, somewhat enlarged, and broken away, of a telescoping arm structure while FIGURE 4 represents a similar view of a modified arm structure having hinged joints.

DESCRIPTION OF THE PREFERRED EMBODIMENT

Referring to FIGURE 1, reference character 1 designates a light shield secured to a main body 2 of a typical tracking camera. The latter contains the necessary shutter mechanism, focal surface, film and mirrors (none of which are shown) by which the light from an object is focused onto the film. The latter, upon being developed, constitutes a record of the object at successive positions in its orbit. The film containers are broadly indicated at 3. The body is gimballed, as indicated at 4, in a heavy cast iron U-shaped frame 5 which is rotatably mounted on an upwardly curved yoke 6. The camera 2 extends through the legs of the frame member 5 and is sufficiently long to contain the well-known primary mirror and adjusting devices (not shown). The yoke 6 carries a shaft 7 which extends into a counterboard opening 9 formed in a thick base plate 10. The latter is secured to a foundation block 11. All of the rotary journals are provided with ball bearings (not shown). A camera of the general type described is usually provided with telescope (not shown) in axial coincidence with the axis of the camera. The telescope has a wide focus for quickly locating the region of the satellite. The camera is usually moved on one or more of its axes by motors (not shown) under the control of an operator who follows the movement of the satellite through the telescope. The position of the satellite can also be determined by radar according to modern practice and this position can be translated into azimuth and elevation angles to determine the direction in which the camera is to be pointed. Successive images are formed on the film (not shown) as it is unreeled from one roll and rolled up on the other roll.

Cameras of this type must shown a high resolution factor in order closely to identify a given satellite, especially its shape and orbit as it passes through the field of view of the camera.

I have discovered a practical method and apparatus by which the resolution factor can be ascertained, a system which is practically immune to atmospheric disturbances and one which approximates the conditions under which the satellite to be tracked operates. In accordance with my invention, I set up a specially designed pseudo double star satellite which moves in a true satellite orbit and has point-like sources of reflected light which vary in distance from one another according to a definite rate and separation distance.

Referring to FIGURE 2, this pseudo double star satellite takes a cruciform shape and is constituted of a pair of arms generally indicated at 12, 13, respectively, joined at the center to a small web plate 14. Each arm portion on both sides of the web is constituted of short pieces of tubing each of which is less than one foot long and adapted to telescope into one another as indicated at 12′ (FIGURE 3) or a flexible single piece of tubing may be used. If desired, the sections may alternatively be hinged at oppositely end positions as indicated at 13′ in FIGURE 4. Thus each half of both arms 12, 13, can be slid or folded into a length of not much more than the length of one tubing section. Each end of the arm 13 carries a collapsible sphere 15 of thin fiberglass or non-rigid foam construction which has an outer layer of highly specular aluminized material. This sphere can be collapsed when the satellite constitutes the payload of a rocket but resumes its spherical shape after leaving the rocket. The spheres are preferably quite large, 24 to 48 inches in diameter, and should have a reflection of sunlight of about 80%.

The other arm 12, similar to the arm 13, is formed of short telescoping or foldable sections or a flexible single piece of tubing may be employed. The outermost section carries a cluster of corner prisms 16 which are preferably constituted of quartz and have many light reflecting facets as indicated by the shaded faces. It is desirable that the length of each arm when fully extended should measure preferably about 10 feet between the center of the spheres and also between the center of the prisms. This space should be at least sufficient that the angular separation of the two virtual solar images and the two prism arrays are at least larger than the minimum angular separation that the cameras and its associated telescope can reasonably resolve under favorable conditions of adjustment and atmospheric disturbances.

Both arrays are placed at definite known separation distances upon deployment after injection into orbit by extension of the telescoping or collapsing tubing. The pseudo-double star is to be placed in orbit at a height above the earth sufficiently low (250 to 450 miles) that with a seperation of 10 to 15 feet between the spheres, the point-like minified images of the sun in the mirror-like surface of the spheres, the spheres will be separated by one to three arc seconds, i.e., large enough for the telescopic camera to resolve as a separation of the points of light, but at a height above the earth sufficiently great that air drag will not bring the satellite back to earth or slow its rotation. Similarly the corner reflectors 16 produce point-like sources of light when illuminated by a high power laser beam 17 (FIGURE 1) generated by suitable and well-known apparatus 18 mounted on or near the camera. The laser beam as reflected by the members 16 is returned almost to its point of origin.

The satellite is caused to rotate slowly about its center of gravity (about 6 r.p.m.) as explained hereinafter, as it travels about its assigned orbit. The arms will become extended due to centrifugal force and the arrays in the planes of the arms will execute a circular motion about the center of mass. If the arrays are viewed from any direction other than along the axis of rotation, the apparent motion will constitute an ellipse whose major axis (hence the separation of the point sources) will be that of the circle of motion. If the observer is in the plane of motion, the point sources will appear to move to this calculatable maximum separation twice in each full rotation and then to merge into a single coalesced source twice in each rotation. The instance of coalescence and separation of the light sources can be used to establish the resolution attained by the telescopic camera.

Since the maximum apparent separation of the array depends upon only the mechanically-established separation and the slant range to the array and since the slant range can be predicted to an accuracy of a few kilometers by use of radar data collected and analyzed routinely by the national space surveillance agencies, the maximum separation will be known independently of the telescopic image scale. Similarly, the motions of the array about its center of mass can be determined by special radar observations, and the attitude of the rotating cruciform and hence the period of motion, the perspective of viewing, and the angular dimensions of the motion ellipse can be predicted independently of the optical telescopic observations. Only the time of maximum separation and the fraction of a rotational period that the sources are resolved need be determined from the photographic data.

If desired, several small flat mirrors 19 may be attached to the array either as part of the corner prisms or elsewhere so that the photoelectric observations of the reflected sunlight from these mirrors will also allow inference of the axis of rotation analogous to those made on other satellites by established practices.

The practical embodiment of this invention does not require that the spheres be perfect or that the separating arms be completely rigid, only that the spheres be of nearly constant radius and the arms be of nearly the proper length and nearly straight. The package could then consist of collapsible spheres of either fiberglass or non-rigid foam construction (but with an outer layer of highly specular aluminized material) and of telescoping or foldable construction such that the entire package could be folded and/or compressed into a container of only 2–3 feet in diameter and 1–2 feet in height for stowage on the launching rocket. By careful engineering the array would weigh only 40–80 pounds with the possibility of orbiting as a secondary payload. Since the prisms have an indefinite life in space and the aluminized spheres have a life of at least 7 years, and since the rotational motion imparted initially to the satellite will last for many years if care is taken to make the target magnetically inert, the contrast of the sources against the sky background and the changing separation will be maintained for months to years.

A more elaborate embodiment would be an extended array of 4 to 12 such sources which would allow study of the size of the region affected by atmospheric disturbances, i.e. the extent of so-called isoplanatic regions in which the optical paths through the atmosphere are disturbed in a similar manner. This would utilize the relative motion of the point images from their known position in the array.

The rotation of the pseudo-double-star satellite in its orbit and at the slow rate mentioned hereinbefore can be effected in any suitable and well-known manner either by the use of a special accessory attached to the rocket which becomes operable at the time of ejection or as forming part of the satellite, such as a self-activated miniature jet.

Calibration satellites of this type are useful to allow the quantitative testing of long focus telescopes and cameras intended for use in locating and photographing orbiting or ballistic objects for the purpose of resolving their shapes. Although a single such satellite launched into a high inclination orbit could suffice for test purposes at all latitudes less than the inclination angle, the relative low cost and simplicity may lead to the desirability of placing several in orbit with inclinations tailored to the instrument sites or to have several targets distributed in longitude and hence in different twilight observability.

A telescopic camera or telescope that has been calibrated in the manner set forth, i.e. having a high resolution factor can easily follow a real satellite within its scope of vision and take a succession of sharply defined pictures as it is moved at the same angular velocity as the satellite.

While a certain specific embodiment has been described, it is obvious that numerous changes may be made without departing from the general principles and scope of the invention.

I claim:
1. Test apparatus for determining the resolution of a telescopic camera for tracking satellites, said apparatus including a test satellite having a pair of arms which cross one another at right angles, each end of one arm having affixed thereto an object provided with a specular surface for reflecting sunlight, each end of the other having affixed thereto an object for reflecting light when activated by a laser beam, said arms being of substantially equal length, said test satellite being adapted to be injected into an orbit comparable to that of a satellite to be tracked and when in orbit given a rotary motion about its center of gravity whereby the light reflected from the objects at the ends of said arms appear to the camera as point-like sources which approach, then coalesce and then move away from one another from which the resolution of the camera can be determined.

2. Test apparatus according to claim 1 and in which said objects which have a specular surface are constituted of spheres to receive sunlight from many different angles and the other objects are constituted of a corner cube of quartz crystal having a plurality of reflecting faces in order to be activated by a laser beam and return the laser beam almost precisely to its point of origin.

3. Test apparatus according to claim 2, and in which the spheres are formed of thin fiber glass aluminized to a mirror-like surface.

4. Test apparatus according to claim 1 and in which said arms are constituted of tubular lengths which are adapted to assume a temporary collapsed state and the spherical end members are adapted to be collapsed in order to limit the size of the bundle to be injected into space.

5. Test apparatus according to claim 4 and in which the arms which are adapted to assume a collapsed state and the spherical members which are collapsed during the rocket flight are caused to expand to their fully extended length and spherical shape when the test apparatus has attained its predetermined orbit and its proper rotary movement within that orbit has been established.

References Cited

UNITED STATES PATENTS

| | | | |
|---|---|---|---|
| 3,168,263 | 2/1965 | Kamm | 244—1 |
| 3,190,581 | 6/1965 | Wilson | 244—1 |
| 3,268,183 | 8/1966 | Etkin | 244—1 |

FERGUS S. MIDDLETON, Primary Examiner

U.S. Cl. X.R.

250—217; 356—124